(12) United States Patent
Mattox, Jr. et al.

(10) Patent No.: US 11,222,090 B2
(45) Date of Patent: Jan. 11, 2022

(54) SITE AND SERVICE SIGNALS FOR DRIVING AUTOMATED CUSTOM SYSTEM CONFIGURATION

(71) Applicant: Microsoft Technology Licensing, LLC, Redmond, WA (US)

(72) Inventors: Gregory Thomas Mattox, Jr., Bellevue, WA (US); Raju Jain, Kirkland, WA (US); Jeffrey Jay Johnson, Bellevue, WA (US); David Michael Schab, Bellevue, WA (US)

(73) Assignee: Microsoft Tecnology Licensing, LLC, Redmond, WA (US)

( * ) Notice: Subject to any disclaimer, the term of this patent is extended or adjusted under 35 U.S.C. 154(b) by 84 days.

(21) Appl. No.: 16/568,654

(22) Filed: Sep. 12, 2019

(65) Prior Publication Data

US 2021/0081486 A1    Mar. 18, 2021

(51) Int. Cl.
*G06F 3/048* (2013.01)
*G06N 20/00* (2019.01)
*G06F 16/957* (2019.01)
*G06F 16/958* (2019.01)
*G06F 3/0482* (2013.01)
(Continued)

(52) U.S. Cl.
CPC ........ *G06F 16/9577* (2019.01); *G06F 3/0482* (2013.01); *G06F 9/45512* (2013.01); *G06F 9/541* (2013.01); *G06F 16/958* (2019.01); *G06N 5/022* (2013.01); *G06N 20/00* (2019.01)

(58) Field of Classification Search
CPC .... G06F 16/95; G06F 16/957; G06F 16/9577; G06F 9/451; G06F 9/45512; G06F 9/541; G06F 16/958; G06F 3/0482; G06N 20/00; G06N 5/022
See application file for complete search history.

(56) References Cited

U.S. PATENT DOCUMENTS 8,176,431 B1 *   5/2012   Scannell ............ G06Q 30/0643
                                                        715/762
9,389,928 B1 *   7/2016   Surti ...................... G06F 21/445
(Continued)

FOREIGN PATENT DOCUMENTS

WO         2014146265 A1      9/2014

OTHER PUBLICATIONS

"Remote-Browser—Visual Studio Marketplace", Retrieved from: https://marketplace.visualstudio.com/items?ItemName=sprdp.remote-browser#overview, Apr. 6, 2019, 3 Pages.
(Continued)

*Primary Examiner* — Mahelet Shiberou

(57) ABSTRACT

In non-limiting examples of the present disclosure, systems, methods and devices for integrating web services in shell constructs are provided. Web browsing data, application activity data, and/or device data for a user may be received. A machine learning model may be applied to the data. One or more recommendations may be surfaced based on application of the machine learning model to the data. The recommendations may comprise one or more of: recommendations to install applications; recommendations to add service extensions; recommendations to pin and/or add a shortcut to a website; and/or recommendations to add platform integration services amongst multiple devices.

20 Claims, 16 Drawing Sheets

(51) Int. Cl.
  *G06F 9/455* (2018.01)
  *G06F 9/54* (2006.01)
  *G06N 5/02* (2006.01)

(56) References Cited

U.S. PATENT DOCUMENTS

| | | | |
|---|---|---|---|
| 10,346,284 B1* | 7/2019 | Yang | G06F 11/3616 |
| 10,379,830 B2* | 8/2019 | Prasad | G06F 8/61 |
| 11,016,633 B2* | 5/2021 | Rapp | G06F 3/04817 |
| 2008/0250323 A1* | 10/2008 | Huff | G06F 9/453 |
| | | | 715/733 |
| 2015/0095322 A1* | 4/2015 | Procopio | G06Q 30/0631 |
| | | | 707/723 |
| 2016/0342805 A1* | 11/2016 | Lim | G06F 16/93 |
| 2017/0039372 A1* | 2/2017 | Koval | G06F 21/602 |
| 2017/0329581 A1* | 11/2017 | Jann | G06F 8/38 |
| 2019/0342411 A1* | 11/2019 | Becker | H04L 51/24 |

OTHER PUBLICATIONS

Kulp, Arian, "Windows 7: Jump Lists", Retrieved from: https://channel9.msdn.com/coding4fun/articles/Windows-7-Jump-lists, Dec. 9, 2009, 6 Pages.

"International Search Report and Written Opinion Issued in PCT Application No. PCT/US20/038290", dated Oct. 12, 2020, 13 Pages.

* cited by examiner

SITE AND SERVICE SIGNALS FOR DRIVING AUTOMATED CUSTOM SYSTEM CONFIGURATION

BACKGROUND

Users increasingly utilize online sites and services in performing tasks that were typically performed on task-specific applications. Those online sites and services provide a vast array of resources and can be updated without requiring that users download and install new application versions. However, navigating to specific pages of websites where desired actions are to be performed can be time consuming and frustrating. Users also must familiarize themselves with the specifics of each new website that they utilize to perform desired actions, while they are typically more familiar with the shell constructs of an operating system of their computing device.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for integrating web services and/or applications in shell constructs. A site and service recommendation platform may analyze user data in making shell integration recommendations. The user data may include web browser use data, site browsing use data (e.g., number of times site is accessed, frequency of site access, site engagement data, etc.), service use data, and/or application use data. The user data may be related to a single computing device, a plurality of computing devices, and/or one or more device platforms. The site and service recommendation platform may apply one or more machine learning models to the user data to identify recommendations to surface for a user. For example, the site and service recommendation platform may apply one or more neural networks and/or statistical machine learning models to user site, service and/or application data to identify recommendations that are likely to be useful to users. The recommendations may comprise one or more of: recommendations to install applications; recommendations to add service extensions; recommendations to pin and/or add a shortcut to a website; and/or recommendations to add platform integration services amongst multiple devices.

BRIEF DESCRIPTION OF THE DRAWINGS

Non-limiting and non-exhaustive examples are described with reference to the following figures.

DETAILED DESCRIPTION

Figure 1:
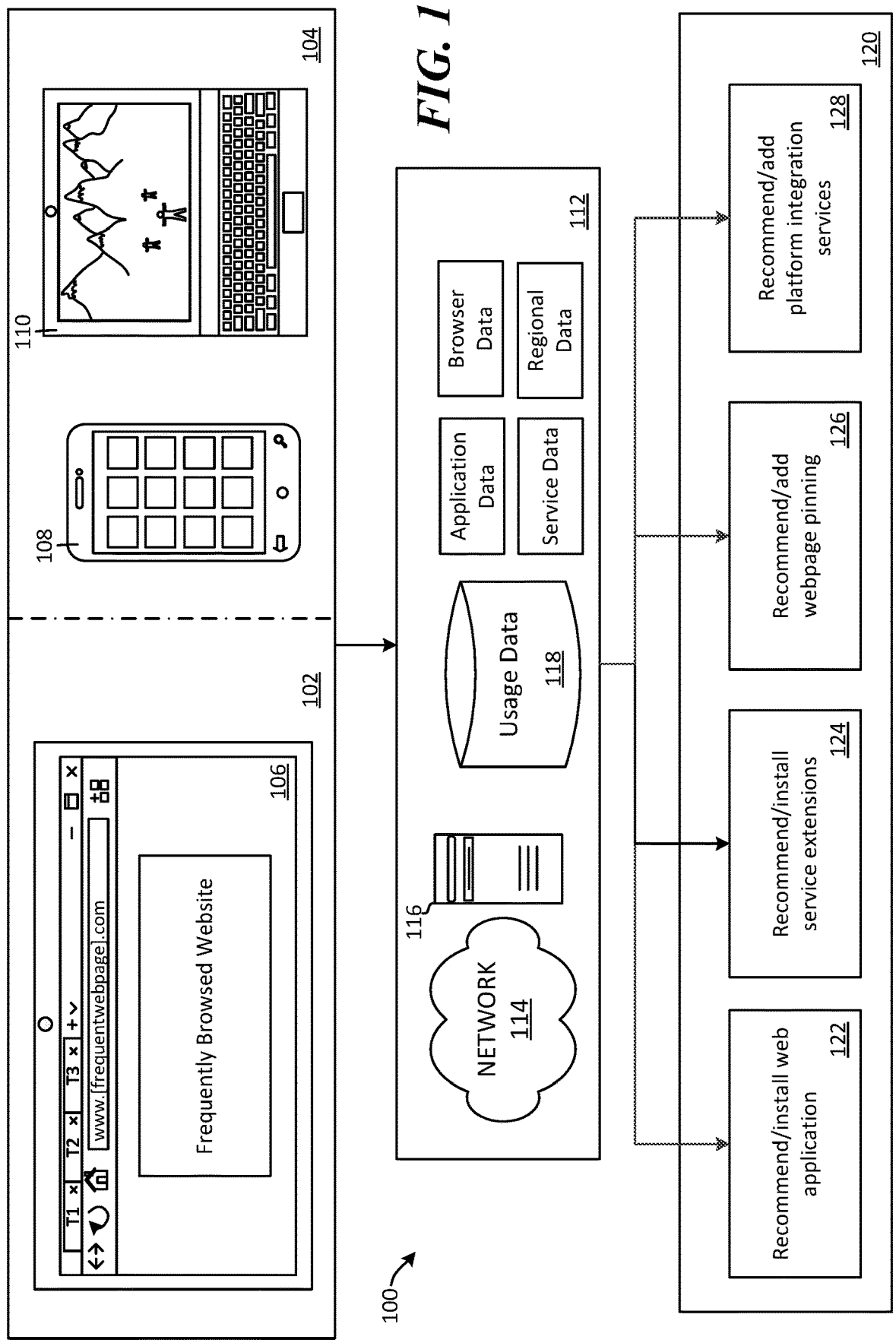
FIG. 1 is a schematic diagram illustrating an example distributed computing environment for integrating web services in shell constructs.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for integrating web services and/or applications in shell constructs. The shell constructs may include file browsing constructs, desktop constructs, taskbar constructs, and start menu constructs, among others. Aspects of this disclosure leverage web browsing data, application data, device data and service data of users to intelligently identify recommendations that are likely to be useful for specific users. A site and service recommendation platform may receive user data for a specific user (based on a user account associated with the user) and provide web service and/or application integration recommendations for that specific user based on analysis of the user's data. In other examples, the site and service recommendation platform may receive data for other users (based on user accounts associated with those users) that have overlapping characteristics with a specific user, and that data may be utilized in providing web service and/or application integration recommendations for the specific user. The site and service recommendation platform may apply one or more machine learning models to the user data in making integration recommendations.

According to some examples, the site and service recommendation platform may provide a recommendation that a user install a web application for an application that the user accesses frequently and/or that the user has a high level of engagement with. In another example, the site and service recommendation platform may provide a recommendation that a user install an extension for an application and/or service based on various use factors. In still additional examples, the site and service recommendation platform may provide a recommendation that a user pin and/or add a shortcut to a website that a user accesses frequently and/or that the user has a high level of engagement with. Those shortcuts may provide enhanced jump list actions that allow users to initiate site actions more efficiently than is possible in a typical web browser. In other examples, the site and service recommendation platform may provide a recommendation that a user add a shortcut to one or more features of a second device associated with the user. In additional examples, the site and service recommendation platform may provide a recommendation that a user pin and/or add a shortcut to files, folders, websites and/or applications based on the user's role in an organization.

The systems, methods, and devices described herein provide technical advantages for integrating web services and/or applications in shell constructs. Processing costs (i.e., CPU cycles) are reduced via the mechanisms described herein in that frequently accessed sites and services may be accessed via shortcuts that require less operations to perform than accessing those sites and services would otherwise require. The installing of extensions via the recommendations described herein may also reduce processing costs associated with performing the actions those extensions provide access to. For example, installing, based on a site and service platform recommendation, an extension for navigating files stored at an online storage site directly and/or natively from a shell or shell construct may reduce the number of operations that are necessary to navigate those files (i.e., more computing operations are required to navigate to files on the online storage site via a web browser than a file browsing extension).

FIG. 1 is a schematic diagram illustrating an example distributed computing environment 100 for integrating web services in shell constructs. Computing environment 100 includes primary local computing device sub-environment 102, secondary local computing device sub-environment 104, network and processing sub-environment 112, and recommendation sub-environment 120.

Primary local computing device sub-environment 102 includes computing device 106. Secondary local computing device sub-environment 104 includes mobile computing device 108 and laptop computing device 110. Each of computing devices 106, 108 and 110 may be associated with a same user and/or same user account. For example, a user may utilize a same or different set of login credentials to access each of computing devices 106, 108 and 110. Computing devices 106, 108 and 110 may run the same or different operating system.

Network and processing sub-environment 112 includes network 114, via which any of the computing devices described herein may communicate with one another, server computing device 116, and usage data store 118. One or more server computing devices in network and processing sub-environment 112, such as server computing device 116, may host a site and service recommendation platform. In some examples, the site and service recommendation platform may be hosted entirely remotely (e.g., in the cloud) from each of computing devices 106, 108 and 110. In other examples, the site and service recommendation platform may be hosted partially remotely and partially locally on one or more of computing devices 106, 108 and 110.

In some examples, if the site and service recommendation platform has been granted with user permission to access web browsing, application use, device, and service use data from one or more of computing device 106, 108 and 110, the site and service recommendation platform may receive and analyze that data that it has been granted access to. That is, the site and service recommendation platform may receive web browsing data from one or more web browser applications installed on computing device 106, 108 and 110. The web browsing data may include: identities of websites browsed to; identities of features of websites utilized; duration of time spent on websites, webpages and/or portions of webpages; frequency of website browsing for specific websites; content downloaded from websites; content uploaded to websites; identities of web applications utilized; identities of web application features utilized; websites that have been bookmarked and/or added to a "favorites" list; and/or data input into various input fields of websites. The application use and/or service use data may include application activity feed data comprising: identities of local applications utilized by a user; identities of shell actions utilized by a user; and/or identities of local application features utilized by a user. The device data may include: identities of devices, specifications of devices (e.g., processing resources, memory resources), identity of applications that are installed, identity of operating system, and/or identity of currently installed extensions and/or services. In some examples, the site and service recommendation platform may determine a number of times that sites, applications and/or services are accessed and generate a list of frequently utilized sites, applications and/or services. In other examples, the site and service recommendation platform may generate a list of popular sites, applications and/or services based on criteria other than frequency of use (e.g., user engagement, time spent using, device characteristics etc.). Those lists may be specific to a user (e.g., a user associated with computing devices 106, 108 and 110). The site and service recommendation platform may also generate frequency and/or popularity lists from analysis of a plurality of users. In some examples, those frequency and/or popularity lists may be categorized based on geographic region (e.g., X application is popular and/or accessed frequently by a threshold number and/or percentage of users in North America, Y web service is popular and/or accessed frequently by a threshold number and/or percentage of users in South America) and/or by user demographics (e.g., age, gender, etc.). In some examples, the site and service recommendation platform may store some or all of the user data and/or lists in usage data store 118.

The site and service recommendation platform may generate recommendations that are surfaced on a user's computing device. In examples where the site and service recommendation platform has sufficient user-specific data to make accurate determinations for the specific user (e.g., with 85% accuracy, with 90% accuracy, with 95% accuracy, etc.) regarding the user's preferred sites and services, the site and service recommendation platform may make recommendations based on that user-specific data. In examples where the site and service recommendation platform does not have sufficient user-specific data for a user to make accurate determinations regarding a user's preferred sites and services, the site and service recommendation platform may make recommendations based on regional user data and/or demographic user data (e.g., users in a user's same region and/or users that have same or similar demographics). In additional examples, the site and service recommendation platform may make recommendations based on a combination of two or more of user-specific data, regional user data, and/or demographic user data.

The site and service recommendation platform may generate site, service and/or application recommendations based on applying one or more machine learning models to user data. For example, the site and service recommendation platform may apply one or more neural networks and/or statistical machine learning models to user site, service and/or application data to identify recommendations that are likely to be useful to users. Additionally or alternatively, the site and service recommendation platform may generate site, service and/or application recommendations based on applying a ranking model to user site, service and/or application data. The ranking model may analyze user data for a window of time (e.g., last 30 days, last 60 days). That data may be organized by temporal subsets of the window (e.g., by date, by hour). In some examples, the ranking model may apply a weight to user data based on the temporal subset that the data was accessed/generated in. For example, a unique website, application, and/or service may be given a starting weight of zero. Weights may be assigned to temporal subsets (dates, hours, etc.) of a temporal window (e.g., past 30 days, past 60 days, etc.) that data is being analyzed for. For example, if data for the past 30 days is being analyzed, a lowest weight may be applied to sites, applications and services that were accessed the furthest back (e.g., day 1) and a highest weight may be applied to sites, applications and services that were accessed closest to the present time (e.g., day 30). In some examples, if a site, application or service is accessed more than once in a temporal subset, the weight for that site, application and/or service may be increased according to the number of times that it was accessed in that temporal subset (i.e., higher frequency of access results in a higher weight and/or score). In examples, once the weights have been assigned to each site, application and/or service that was accessed during the temporal window, a ranked list of most relevant sites, applications and/or services for a user may be generated. In this manner, the ranking model may prioritize recommendations for sites, applications and services that users accessed recently and/or often.

In some examples, the site and service recommendation platform may generate recommendations that a user download and/or install web applications for websites that are frequently utilized by a user and/or that have a high level of engagement by a user, as illustrated by recommendation element 122 in recommendation sub-environment 120. In additional examples, the site and service recommendation platform may generate recommendations that a user download and/or install one or more extensions associated with sites and services that are frequently utilized, that a user has a high level of engagement for, and/or that a user is determined to likely utilize based on other devices that are known to be associated with a user, as illustrated by recommendation element 124 in recommendation sub-environment 120. In some examples, the site and service recommendation platform may generate recommendations that a user pin or otherwise incorporate a shortcut to a website or web application to an operating system shell construct, as illustrated by recommendation element 126 in recommendation sub-environment 120. In additional examples, the site and service recommendation platform may generate recommendations that a user download and/or install platform integration services for interacting with content associated with a users' multiple devices that operate on different platforms, as illustrated by recommendation element 128 in recommendation sub-environment 120. In some examples, the site and service recommendation platform may determine that an application is installed on one of a user's devices and recommend that the user install the application on a different device associated with the user. The devices may operate on same or different platforms. For example, if a first device associated with a user account connects (e.g., via USB, via Bluetooth) to a second device associated with the user account, and a music application is installed on the first device but not the second device, a recommendation may be surfaced on the second device to download and/or install the music application on the second device.

According to some examples, the site and service recommendation platform may surface a recommendation that a user pin and/or add a shortcut to folders, files, websites and/or applications (or download applications) based on a role of a user in an organization. The role of a user in an organization may be identified based on a user's login credentials for a computing device, a database of user roles corresponding to login credentials, and/or based on a designated user role indicated by a computing device logged into by a user. The recommendations may be generated based on the site and service recommendation platform determining that users in same or similar roles as the user frequently access the folders, files, website and/or applications for which the recommendations are being generated/surfaced, and/or based on a relatively high level of engagement with those folders, files, websites and/or applications by users in same or similar roles.

Additional information regarding the various recommendations that the site and service recommendation platform may generate and cause to be surfaced are provided below.

Figure 2:
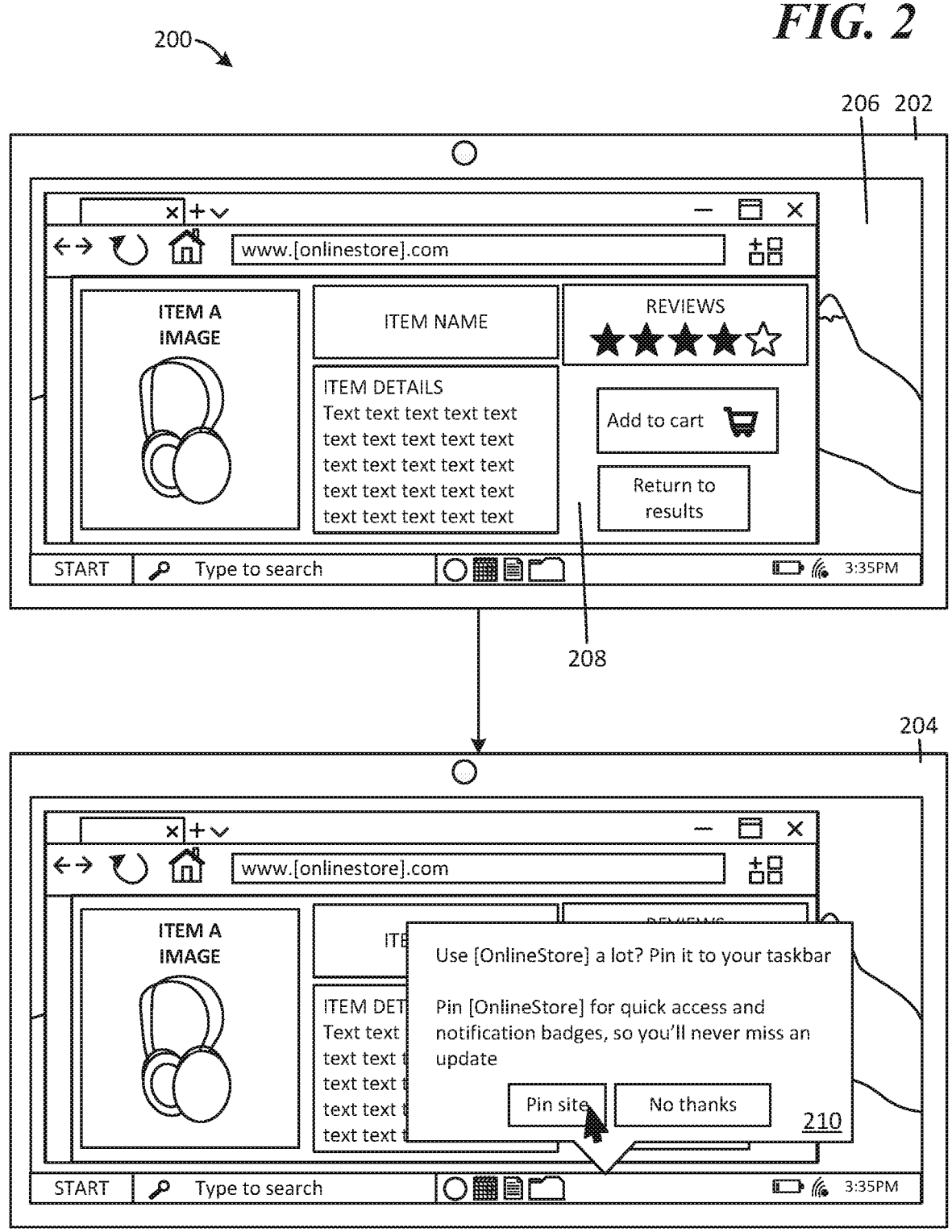
FIG. 2 is a schematic diagram illustrating the surfacing of a selectable option for adding a shortcut to a frequently accessed website to an operating system shell construct.

FIG. 2 is a schematic diagram 200 illustrating the surfacing of a selectable option for adding a shortcut to a frequently accessed website to an operating system shell construct. Diagram 200 includes computing device 202 and computing device 204 which are the same computing device. Computing device 202 displays a desktop background 206 with an overlapping open web browser window 208. The web browser window 208 is currently navigated to and displaying a webpage for www.[onlinestore].com. In this example, the site and service recommendation platform may have analyzed web browsing data for a user associated with computing device 202 and 204 and made a determination based on that analysis that the user frequently accesses and/or engages to a threshold level with the open website and identified and/or generated an appropriate recommendation based on that analysis. In other examples, the site and service recommendation platform may have analyzed web browsing data for users in a same or similar overlapping geographic region and/or demographic as the user and identified and/or generated an appropriate recommendation based on that analysis. As such, the site and service recommendation platform may generate and/or cause pinning recommendation 210 to be surfaced on computing device 204. That is, the site and service recommendation platform may cause a recommendation that the user pin a shortcut to the website and/or a shortcut for a progressive web application for the website to an operating system shell element of computing device 204, such as a taskbar, a start menu and/or a desktop. In this example, surfaced pinning recommendation 210 states: "Use [OnlineStore] a lot? Pin it to your taskbar—Pin [OnlineStore] for quick access and notification badges, so you'll never miss an update". Pinning recommendation 210 also has selectable elements for accepting the recommendation to "Pin site" or not pin the cite "No thanks".

Figure 3:
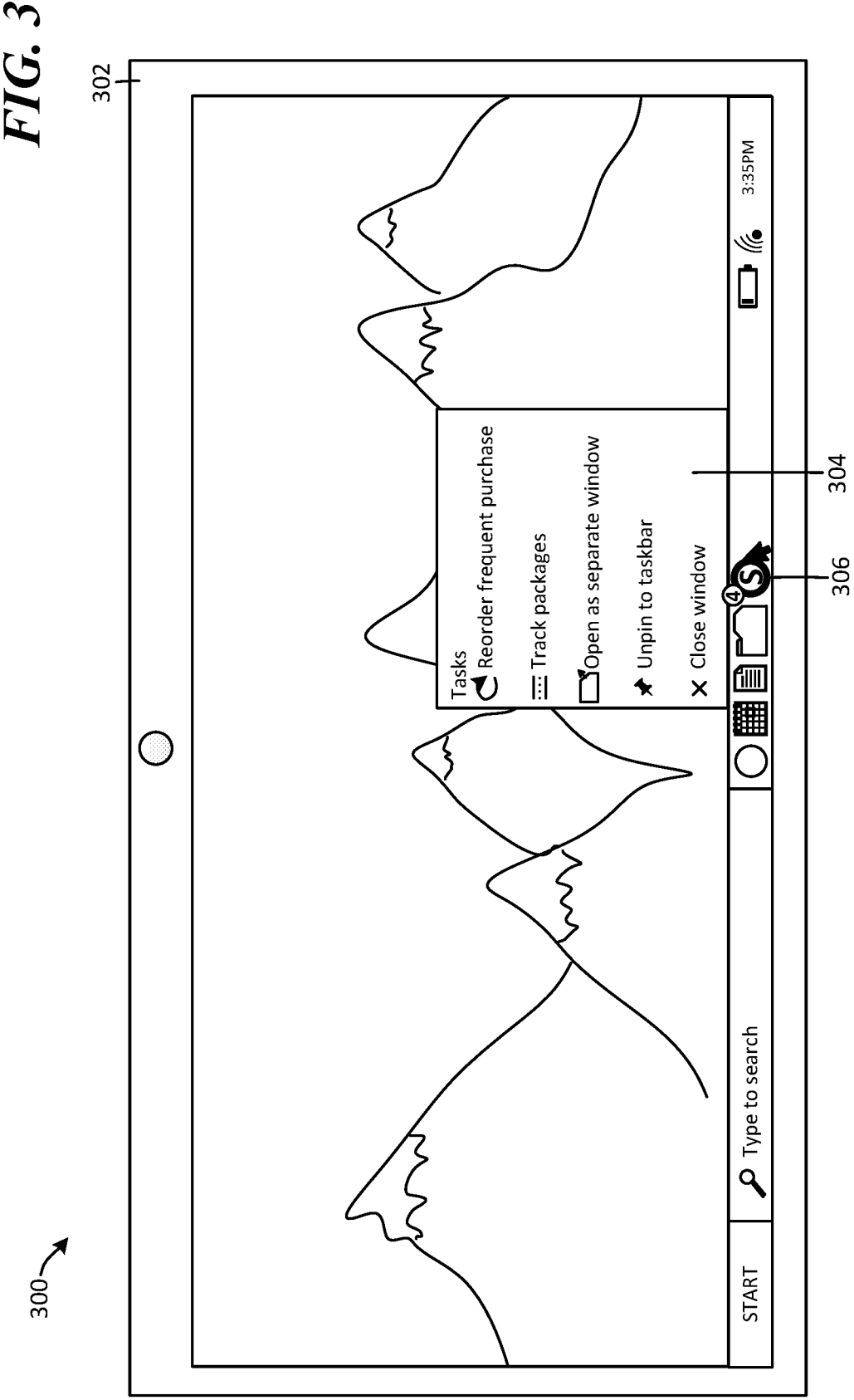
FIG. 3 is a schematic diagram 300 illustrating a user interface for interacting with enhanced functionality provided by jump lists that may be accessed via shortcuts to websites and/or progressive web applications that have been added a taskbar of an operating system shell.

FIG. 3 is a schematic diagram 300 illustrating a user interface for interacting with enhanced functionality provided by jump lists that may be accessed via shortcuts to websites and/or progressive web applications that have been added to a taskbar of an operating system shell. In this example, the selection was made from pinning recommendation 210 in FIG. 2 to pin a shortcut to the online store website to the taskbar. The result of this pinning is shown on computing device 302. Specifically, pinned shortcut element 306 for the online store has been added to the taskbar. According to examples, when a user pins a shortcut for a website and/or a progressive web application for a website to a taskbar or other operating system shell element, the device on which the shortcut has been pinned may receive and display notifications for the website and/or service associated with the website. Examples of notifications that may be received include: new message notifications, new content notifications, shipping notifications, etc. In this example, pinned shortcut element 306 includes an element that indicates that there are four new notifications associated with the user's account in relation to the online store website. The pinned shortcut may be interacted with to provide enhanced functionality associated with the website and/or service. For example, if a user interacts with (hovers a cursor over, right clicks) pinned shortcut element 306, a jump list with executable actions may be displayed. In this example, jump list 304 is caused to be displayed, which includes an action for reordering frequent purchases, tracking packages, opening the website and/or progressive web application in a separate window, as well as options to unpin the shortcut and/or close an open window for the website and/or progressive web application. The executable actions illustrated on jump list 304 are exemplary of actions that might be executed via a jump list for shopping website. Other executable actions may be associated with jump lists for different types of websites and/or progressive web applications. For example, a jump list accessed from a pinned shortcut for a social media website may have executable actions for initiating new posts, initiating new direct messages with other social media users, surfacing group information, surfacing event information, etc.

Figure 4:
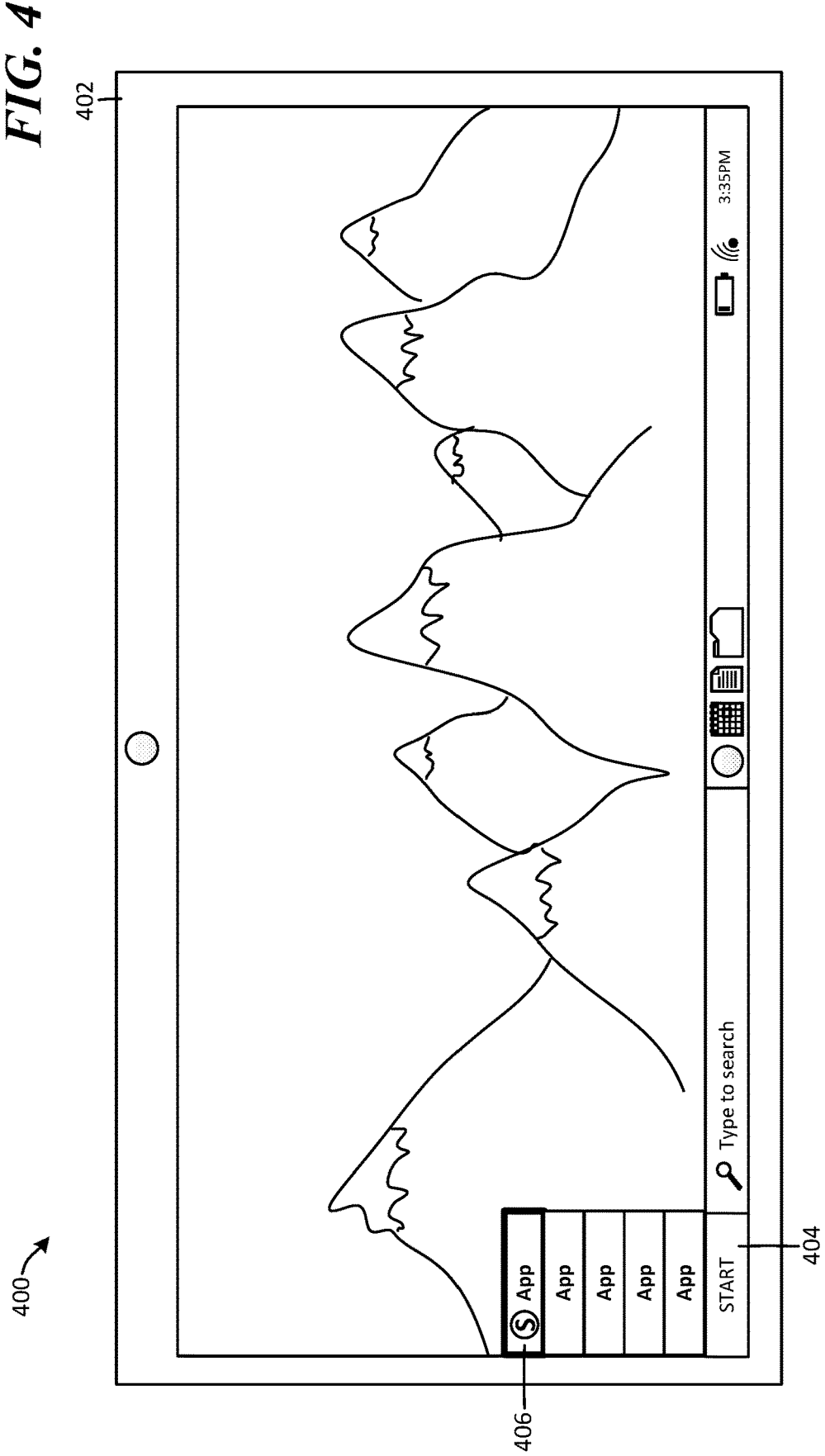
FIG. 4 is a schematic diagram illustrating a user interface for interacting with a website and/or progressive web application via a shortcut that has been added to a start menu accessible via an operating system shell.

FIG. 4 is a schematic diagram 400 illustrating a user interface for interacting with a website and/or progressive web application via a shortcut that has been added to a start menu accessible via an operating system shell. In this example, rather than pinning a website shortcut to the task bar, a user has selected to add a website shortcut to the start menu of the operating system. Specifically, as illustrated on computing device 402, a user has added shortcut 406 for the shopping website to start menu 404 of the operating system.

In some examples, shortcut 406 may be interacted with for opening the shopping website in an already open browser, opening the shopping website in a new browser window, and/or surfacing a jump list with executable actions directly from the jump list.

Figure 5:
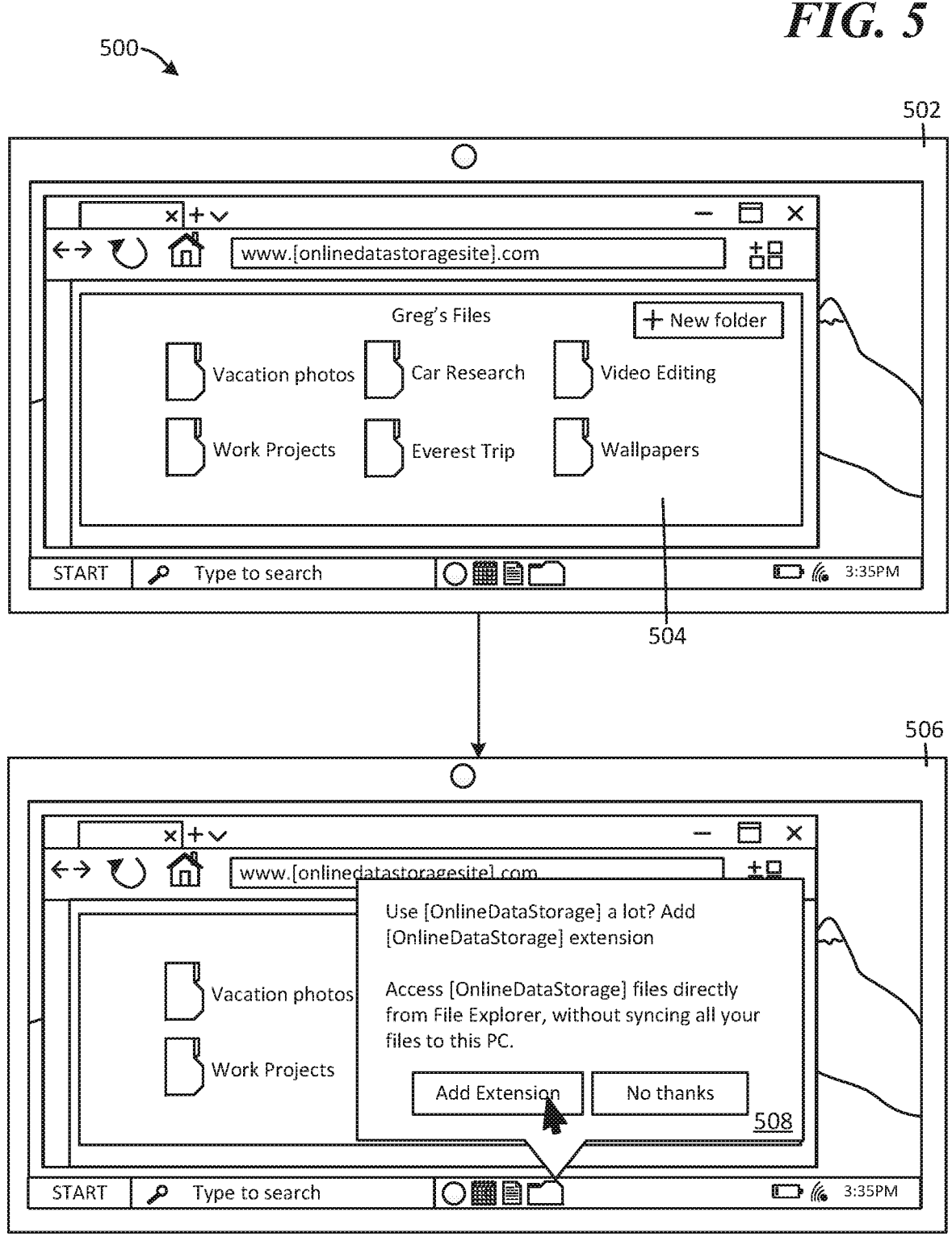
FIG. 5 is a schematic diagram illustrating the surfacing of a selectable option for adding/downloading a file browsing extension for browsing remote files via a file browser of an operating system shell.

FIG. 5 is a schematic diagram 500 illustrating the surfacing of a selectable option for adding/downloading a file browsing extension for browsing remote files via a file browser of an operating system shell. Diagram 500 includes computing device 502 and computing device 506, which are the same computing device. Computing device 502 displays a desktop background and an open overlapping browser window 504, which is navigated to and currently displaying an online storage website (www.[onlinestoragesite].com). In this example a user has signed into the online storage website and that user's folders are therefore displayed in browser window 504. Specifically, browser window 504 displays "Greg's Files" with folders for: "Vacation photos", "Car Research", "Video Editing", "Work Projects", "Everest Trip", and "Wallpapers".

In this example, the site and service recommendation platform may have received web browsing data associated with the user of computing device 502. For example, the site and service recommendation platform may have data indicating that one or more users of computing device 502 have navigated to and/or engaged with the online storage website. In some examples, a determination must be made that a user browse to and/or engage with a website (or use one or more features of a website) to a threshold level before the site and service recommendation platform recommends creating a shortcut for that website and/or downloading and installing an extension for that website. For example, a user may have to navigate to a website X number of times or with Y frequency prior to such a recommendation being made. In other examples, a user may have to utilize a feature of a website (e.g., access files on a file storage website, post updates on a social media website) X number of times or with Y frequency prior to the site and service recommendation platform recommending that an extension for performing that feature be downloaded and/or installed. In still other examples, the site and service recommendation platform may make such recommendations based on determining that a user has accessed a corresponding website or website feature a single time. In additional examples, one or more machine learning models may be applied to the web browsing data, application use data, and/or service use data for a user to determine whether to recommend adding a shortcut for a website and/or to recommend downloading and/or installing an extension for a website feature.

In this example, the site and service recommendation platform has made a determination, based on the user's web browsing data and/or service use data, that a recommendation to download an extension for the online storage website should be surfaced. As such, the site and service recommendation platform causes extension recommendation element 508 to be surfaced. Extension recommendation element 508 states: "Use [OnlineDataStorage] a lot? Add [OnlineDataStorage] extension—Access [OnlineDataStorage] files directly from File Explorer, without syncing all your files to this PC." Extension recommendation element 508 also includes a selectable element to download/install the extension ("Add Extension") and a selectable element to decline the recommendation ("No thanks"). It should be understood that a file browsing extension is just one example of an extension recommendation that may be recommended by the site and service recommendation platform. Other extension types may be recommended for same or different types of websites. Additionally, a recommendation to download an extension (e.g., extension recommendation element 508) may be surfaced when a website associated with the extension is browsed to for a first time after the threshold of engagement has been reached. In other examples, the recommendation to download an extension may be surfaced at a next user login to a computing device associated with the browsing.

Figure 6:
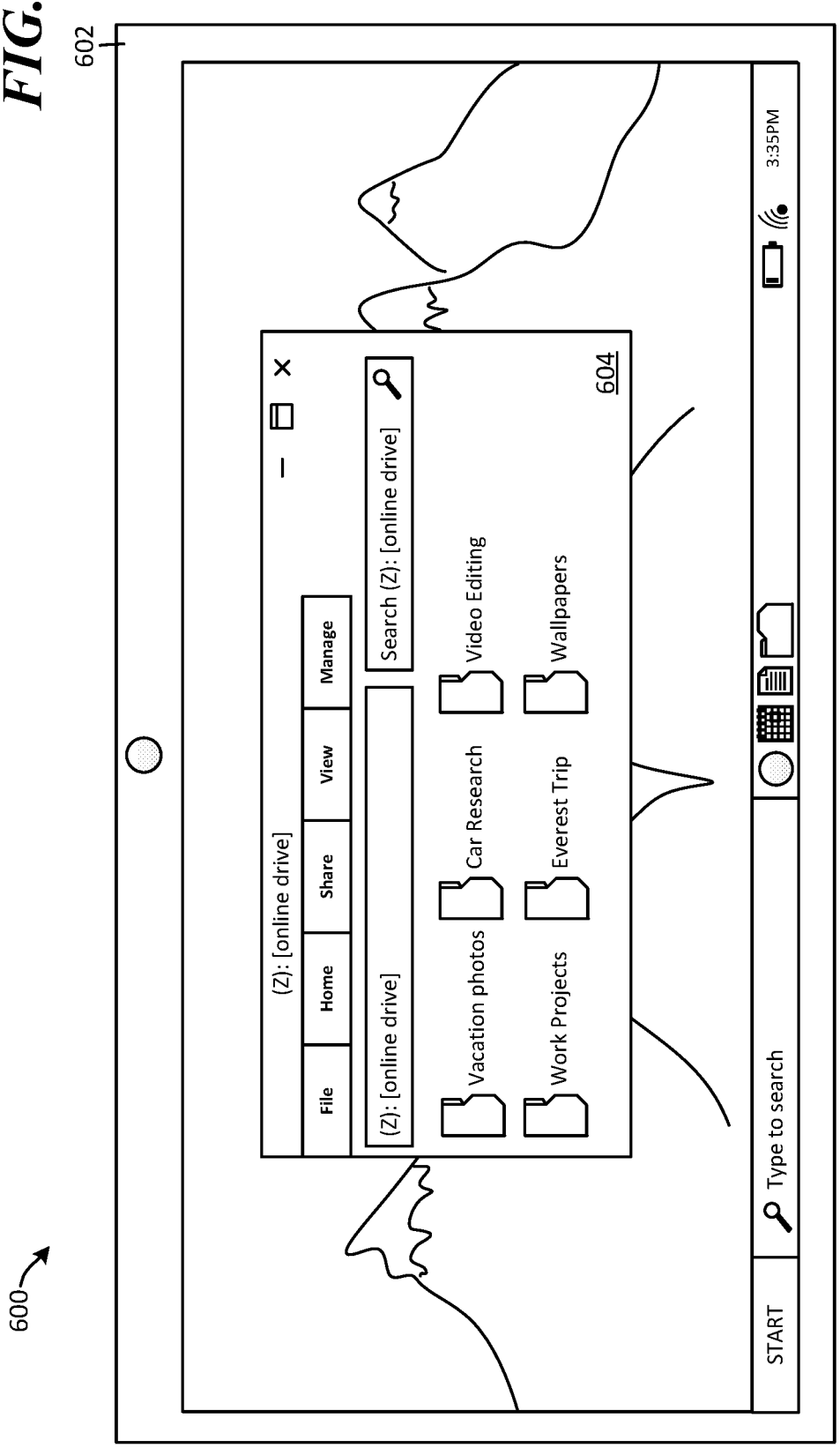
FIG. 6 is a schematic diagram illustrating a user interface for browsing remote files via a file browsing feature of an operating system shell.

FIG. 6 is a schematic diagram 600 illustrating a user interface for browsing remote files via a file browsing feature of an operating system shell. Specifically, computing device 602 displays a result of a user selecting to add the extensions indicated in the recommendation from FIG. 5 (i.e., add the file browsing extension for the online storage website). Computing device 602 displays a desktop background and a file navigation browser for a "Z" drive, which is linked to the files of the online storage website. Thus, a user can browse the files stored on the online storage website via the file browsing feature of the operating system shell of computing device 602.

Figure 7:
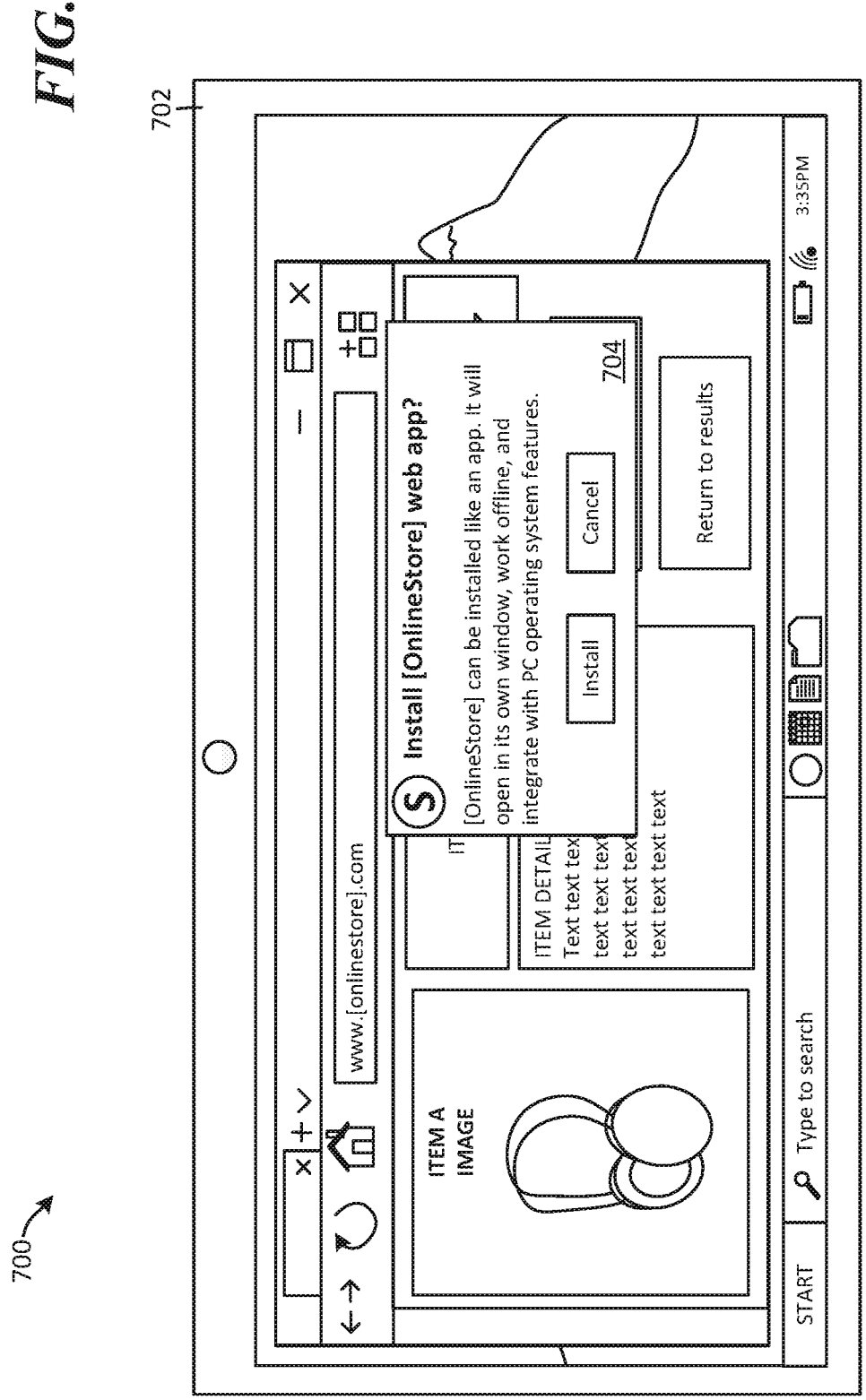
FIG. 7 is a schematic diagram illustrating a user interface displaying a selectable option for downloading and installing a progressive web application for a frequently accessed website.

FIG. 7 is a schematic diagram 700 illustrating a user interface displaying a selectable option for downloading and installing a progressive web application for a frequently accessed website. Diagram 700 includes computing device 702 which is currently displaying a desktop background and an overlapping web browser window that is currently navigated to an online shopping website (www.[onlinestore].com). According to examples, the site and service recommendation platform may analyze web browsing data and make a determination regarding how often, to what engagement level, what number of times, etc. a user accesses and/or interacts with a website and/or one or more features accessible utilizing that website. In some examples, if a determination is made that a computing device and/or a user account associated with one or more computing devices has accessed and/or interacted with a website or a website feature to above a threshold value, the site and service recommendation platform may cause a recommendation to be surfaced that indicates that a progressive web application is available for the website and prompt the user to download/install it. In this example, such a determination has been made, and the site and service recommendation platform causes web application recommendation element 704 to be surfaced on the display of computing device 702. Web application recommendation element 704 states: "Install [OnlineStore] web app? [OnlineStore] can be installed like an app. It will open in its own window, work offline, and integrate with PC operating system features." There are also selectable elements for downloading/installing the web application ("Install") and for ignoring the recommendation ("Cancel"). According to some examples, if an indication to install the web application is received, and the web application is subsequently installed, a shortcut to the web application may be added to an operating system shell element (e.g., a toolbar, a start menu, a desktop).

Figure 8A:
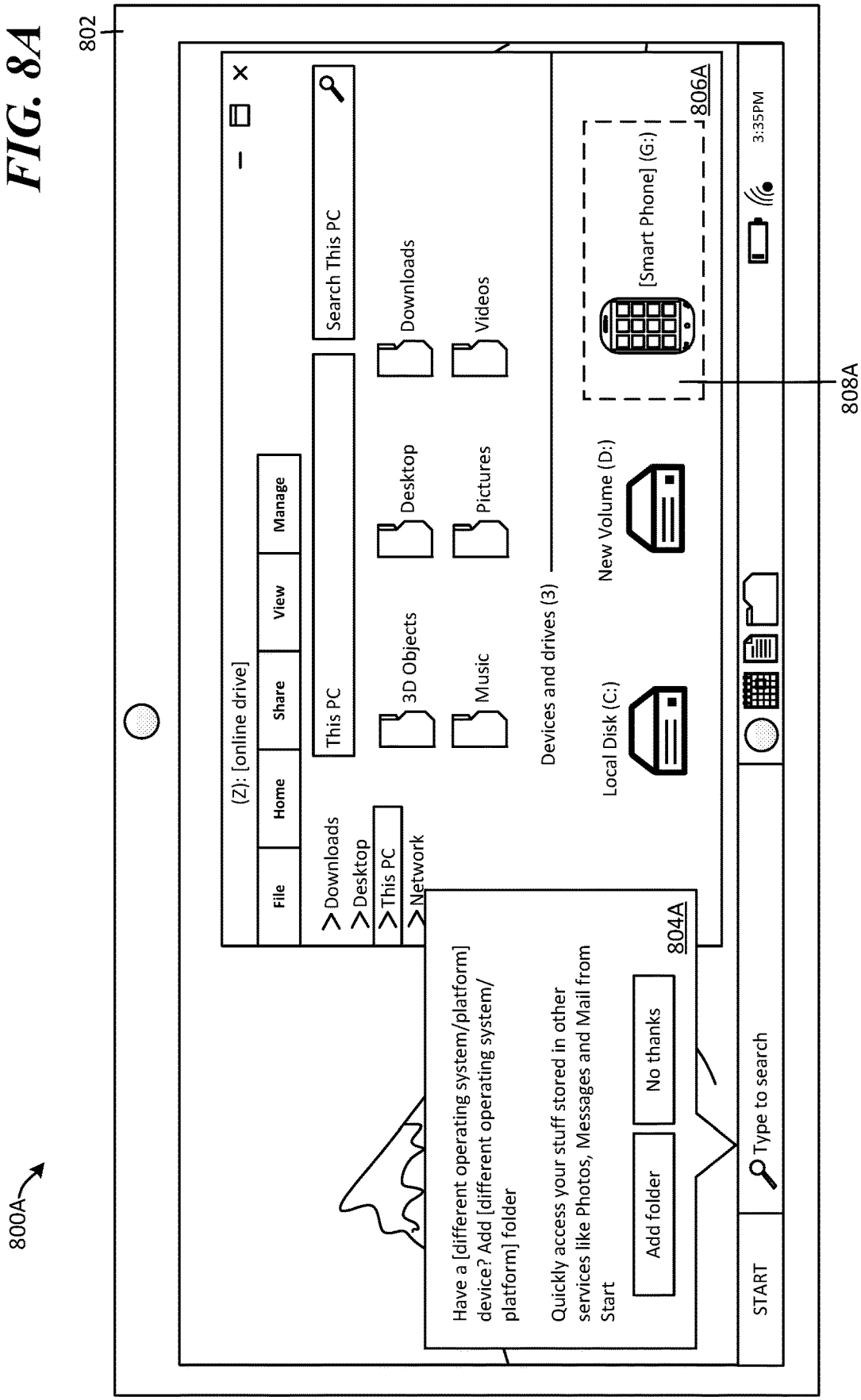
FIG. 8A is a schematic diagram illustrating a user interface displaying a selectable option for adding a folder for a remote storage location associated with a first platform to a file browsing feature of an operating system shell of a second platform.

FIG. 8A is a schematic diagram 800A illustrating a user interface displaying a selectable option for adding a folder for a remote storage location associated with a first platform to a file browsing feature of an operating system shell of a second platform. According to examples, the site and service recommendation platform may receive an indication that a user account accessed on a first device (such as computing device 802A) that operates on a first platform and/or operating system, may also be associated with one or more additional devices that operate on one or more other platforms and/or operating systems. The indication may be received based on a user signing into a same user account on one or more different devices and the site and service recommendation platform receiving that information, as well as information indicating that the one or more other devices operate on different platforms and/or operating systems. In some examples, the identity and/or specifications of specific platforms and/or operating systems for the devices that the user account is used to sign into may also be received by the site and service recommendation platform. In additional examples, specific features and/or services of those platforms and/or operating systems that a user accesses/utilizes on those devices may be received by the site and service recommendation platform. The site and service recommendation platform may detect the identity and/or specifications of devices based on receiving one or more signals from devices a user account associated is logged into. For example, in the illustrated figure computing device 802A may be connected (e.g., USB, Bluetooth) with a smart phone and receive identity and/or specification information for that smart phone.

In this example, the site and service recommendation platform has identified that a user account associated with computing device 802A is also associated with a second device (a smart phone). In some examples, the site and service platform may also determine whether that second device has files that are viewable and/or executable by computing device 802A. In additional examples, the site and service platform may determine whether the second device is associated with a remote storage service (e.g., a cloud storage service that is related to the operating system of the second device). Based on the site and service recommendation platform identifying that the user account associated with computing device 802A is also associated with the smart phone, the site and service recommendation platform causes secondary device recommendation element 804A to be surfaced. Secondary device recommendation element 804A states: "Have a [different operating system/platform] device? Add [different operating system/platform] folder]— Quickly access your stuff stored in other services like Photos, Messages and Mail from Start", with the selectable options for "Add folder" and "No thanks". In this example a selection of the "Add folder" option has been received and the site and service recommendation platform therefore adds the secondary device (the smart phone) associated with the user account to the file browsing feature of computing device 802A's operating system as indicated by smart phone storage element 808A in browsing element 806A. In some examples, in adding the secondary device and/or file storage services associated with the secondary device to the file browsing feature, the site and service recommendation platform may download one or more extensions for integrating those features.

Figure 8B:
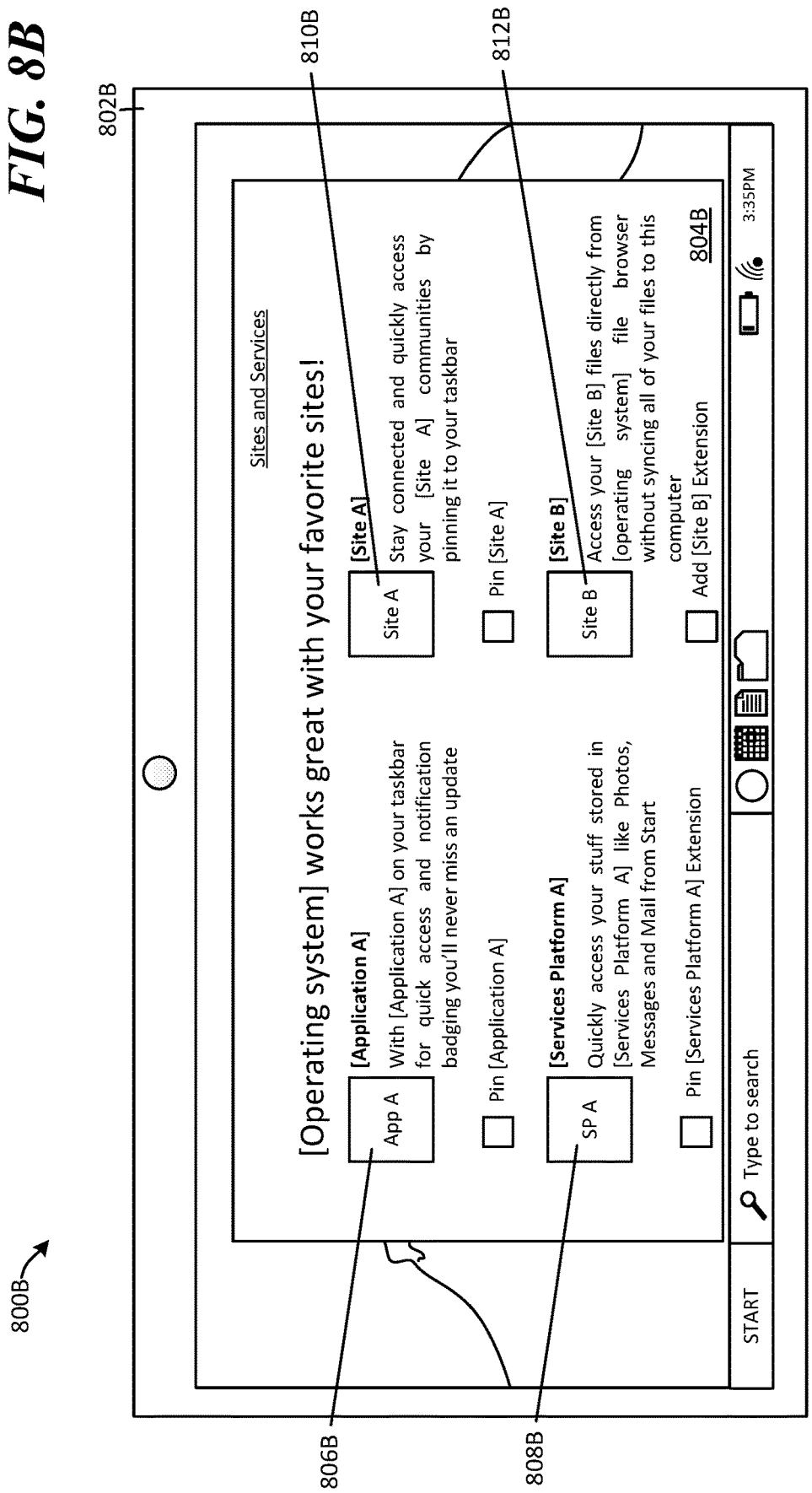
FIG. 8B is a schematic diagram illustrating a user interface for an out of box experience setup process, including surfaced recommendations for pinning and downloading extensions for applications, websites and/or services.

FIG. 8B is a schematic diagram 800B illustrating a user interface for an out of box experience setup process, including surfaced recommendations for pinning and downloading extensions for applications, websites and/or services. In some examples, the out of box experience setup process may be a first setup experience (i.e., a setup process initiated following a user's first boot of a device). In other examples, the out of box experience setup process may be a second chance out of box experience setup process (e.g., a setup process after an operating system update or application update has been installed).

Computing device 802B displays window 804B. Window 804B displays recommendations for pinning websites and applications and downloading and/or installing a site or service extension. In examples, a user associated with computing device 802B may have a user account that is associated with a site and service recommendation platform. The user account (or another account linked to the user account) may have been utilized on one or more computing devices prior to window 804B being surfaced on computing device 802B. In examples, the user may have provided the site and service recommendation platform with access to web browsing, application use, device, and/or service use data for the one or more computing devices that were previously accessed utilizing the user account. The site and service recommendation platform may analyze the data and identify relevant recommendations for surfacing during a setup experience. The recommendations may be based on frequency of site/application/service use, level of engagement with site/application/service use, specifications of devices accessed by user, operating systems of devices accessed by user, and/or a number of times a site/application/service is used, for example.

The recommendations surfaced in window 804B are exemplary of website pinning recommendations and application or service extension download recommendations that may be surfaced by the site and service recommendation platform. Other recommendation types are contemplated. For example, the site and service recommendation platform may surface recommendations to download and/or install applications that are installed on a user's other devices and/or that a user frequently utilizes on the user's other devices.

Recommendation 806B is a recommendation to pin [Application A]. Specifically, the recommendation states: "With [Application A] on your taskbar for quick access and notification badging you'll never miss an update", with a selectable option for pinning [Application A] to a shell construct of computing device 802B.

Recommendation 808B is a recommendation to pin [Services Platform A]. Specifically, the recommendation states: "Quickly access your stuff stored in [Services Platform A] like Photos, Messages and Mail from Start", with a selectable option for pinning entry points and/or extensions to [Services Platform A] to a shell construct of computing device 802B. Thus, recommendation 808B provides mechanisms for recommending the addition of extensions and corresponding shortcuts related to a user's other platforms and devices.

Recommendation 810B is a recommendation to pin [Site A]. Specifically, the recommendation states: "Stay connected and quickly access your [Site A] communities by pinning it to your taskbar", with a selectable option for pinning [Site A] to a shell construct of computing device 802B.

Recommendation 812B is a recommendation to download/install an extension for [Site B]. Specifically, the recommendation states: "Access your [Site B] files directly from [operating system] file browser without syncing all of your files to this computer", with a selectable option for downloading/installing the extension.

The illustrated recommendations are exemplary of specific types of recommendations that may be surfaced based on analysis of collected user/device data associated with a user account. Other recommendation types and a different text may be surfaced during the setup process for a device. Additionally, if the site and service recommendation platform does not have any previous user data for the user associated with computing device 802, it may provide pinning, shortcut, and extension recommendations based on user data for other users that have shared attributes with the user.

Figure 9A:
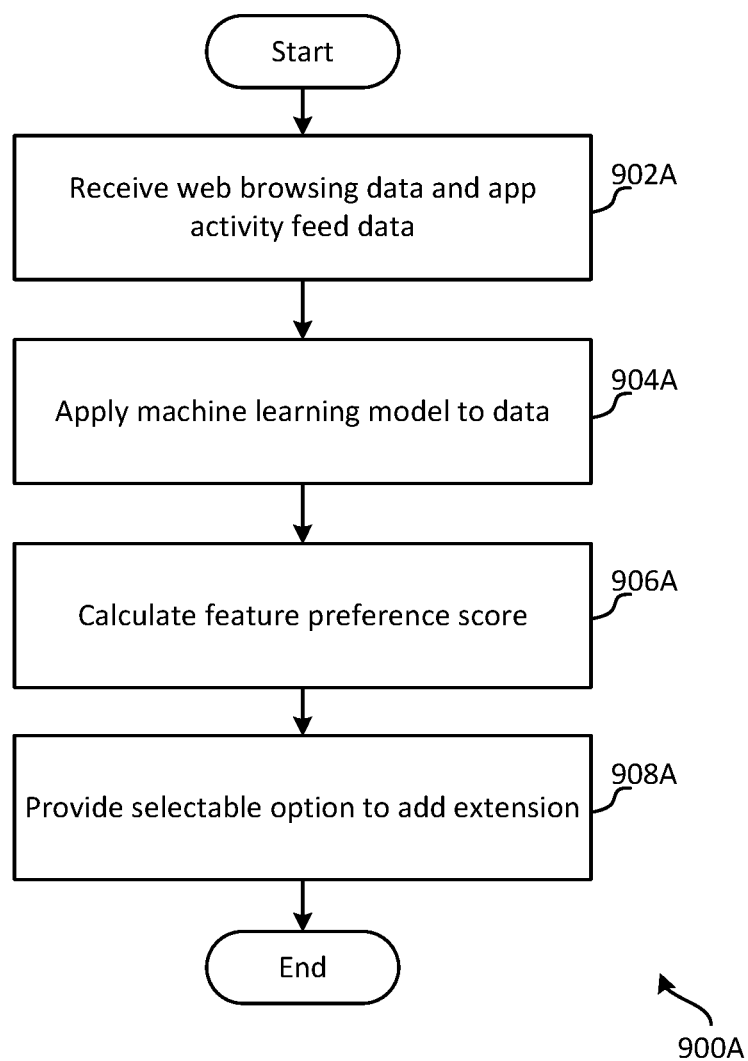
FIG. 9A illustrates an exemplary method for integrating web service extensions in operating system shell constructs.

FIG. 9A illustrates an exemplary method 900A for integrating web service extensions in operating system shell constructs. The method 900A begins at a start operation and flow continues to operation 902A where web browsing data and application activity feed data for a user is received. The web browsing data and application feed data may be received by a site and service recommendation platform. In some examples, the site and service recommendation platform may additionally or alternatively receive device activity data for a device associated with the user (e.g., via a user account used to login to a device). The site and service recommendation platform may operate on one or more local devices (i.e., the user's devices), one or more remote devices (i.e., cloud-based), and/or partially on one or more local devices and partially on one or more remote devices. According to examples, the web browsing data may comprise: identities of websites browsed to by the user; identities of web applications utilized by the user; and/or identities of web application features utilized by the user. The application activity feed data may comprise: identities of local applications frequently utilized by the user; and/or identities of local application features frequently utilized by the user.

From operation 902A flow continues to operation 904A where a machine learning model is applied to the web browsing data and the application activity feed data. The machine learning model may have been trained to generate a feature preference score which is indicative of a likelihood that a user will utilize an extension for a particular feature of a web service.

From operation 904A flow continues to operation 906A where a feature preference score for a feature associated with a web service the user has utilized is calculated based on application of the machine learning model to the web browsing data and application activity feed data. The feature preference score may comprise a percentage value, a number value, a ratio, or a scaled value (e.g., high, medium, low).

From operation 906A flow continues to operation 908A where a selectable option to add an extension for the feature is provided if the calculated feature preference score for the feature is above a threshold value. For example, if the feature preference score is above a certain value (e.g., more than 90% likelihood that a user will utilize the extension; high likelihood that a user will utilize the extension, etc.), the site and service recommendation service may cause the selectable option to be surfaced on a display of the user's local computing device.

From operation 908A flow continues to an end operation and the method 900A ends.

Figure 9B:
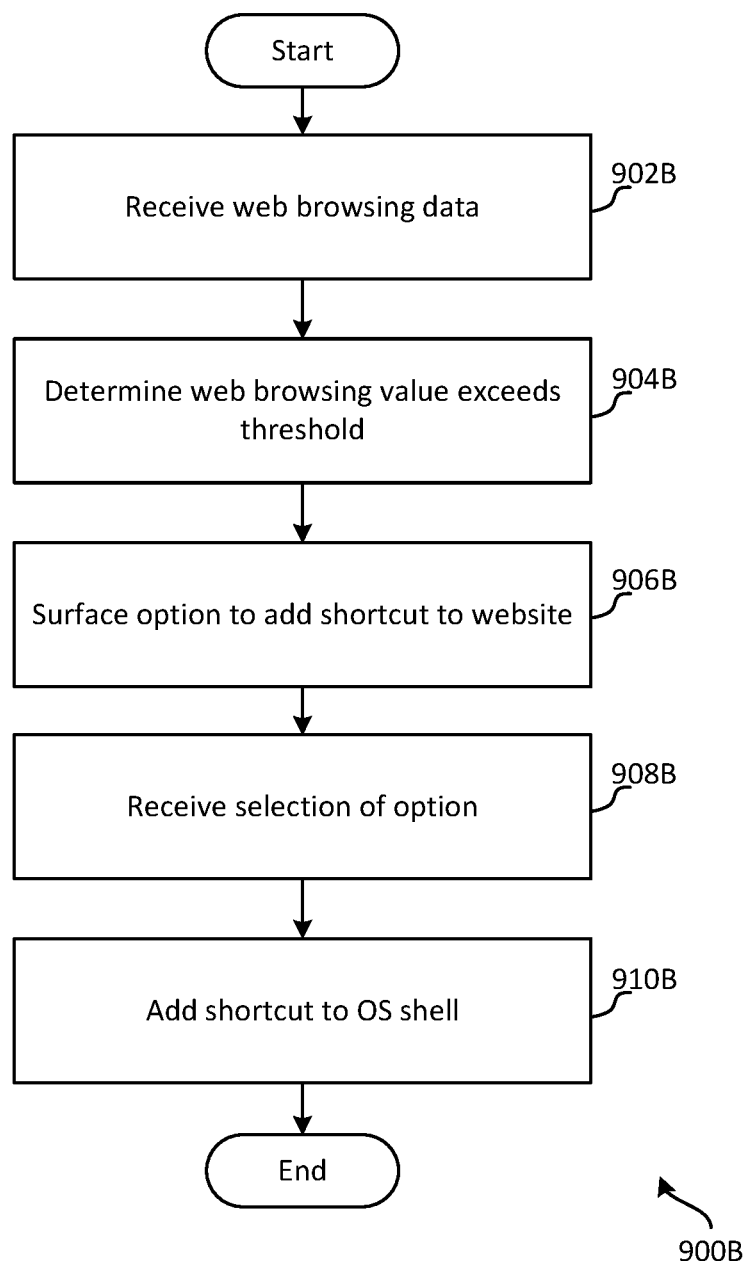
FIG. 9B illustrates an exemplary method for integrating web service shortcuts in operating system shell constructs.

FIG. 9B illustrates an exemplary method 900B for integrating web service shortcuts in operating system shell constructs. The method 900B begins at a start operation and flow moves to operation 902B.

At operation 902B web browsing data for a user is received. The web browsing data may be received by a site and service recommendation platform. In some examples, the site and service recommendation platform may additionally or alternatively receive device activity data and/or application data for a device associated with the user (e.g., via a user account used to login to a device). The site and service recommendation platform may operate on one or more local devices (i.e., the user's devices), one or more remote devices (i.e., cloud-based), and/or partially on one or more local devices and partially on one or more remote devices. According to examples, the web browsing data may comprise: identities of websites browsed to by the user; identities of web applications utilized by the user; identities of web application features utilized by the user; duration of time spent on a website; duration of time spent on a particular portion of a website; duration of time spent using a feature of a website; a number of times a website has been accessed; and/or a number of times that a feature of a website has been accessed.

From operation 902B flow continues to operation 904B where a determination is made that a web browsing value for the user for a website exceeds a minimum threshold value. The web browsing value may relate to a number of times the user accessed a website or website feature, and/or a level of user engagement associated with a website. The threshold value may be a minimum number (e.g., number of times accessed), ratio (e.g., number of times website is accessed over a number of days, number of times website is accessed compared with number of browser instances opened), and/or percentage (e.g., percentage of user engagement associated with a website compared with other websites), for example.

From operation 904B flow continues to operation 906B where a selectable option to add a shortcut to the website on an operating system shell construct of a local computing device associated with the user is surfaced. The option may be selectable for adding the shortcut to a taskbar, a desktop and/or a start menu, for example.

From operation 906B flow continues to operation 908B where a selection of the option is received. The selection may comprise a mouse click, a touch screen input, and/or a verbal command, for example.

From operation 908B flow continues to operation 910B where the shortcut to the website is added on the operating system shell construct of the local computing device. The shortcut may be selectable for opening the website in a new window. The shortcut may also be interactable for initiating the display of a jump list having enhanced website actions accessible therefrom (e.g., view shipping info for a shopping website, post updates on a social media website, etc.). The shortcut may also be utilized for launching a progressive web application for the website.

From operation 910B flow continues to an end operation and the method 900B ends.

Figure 9C:
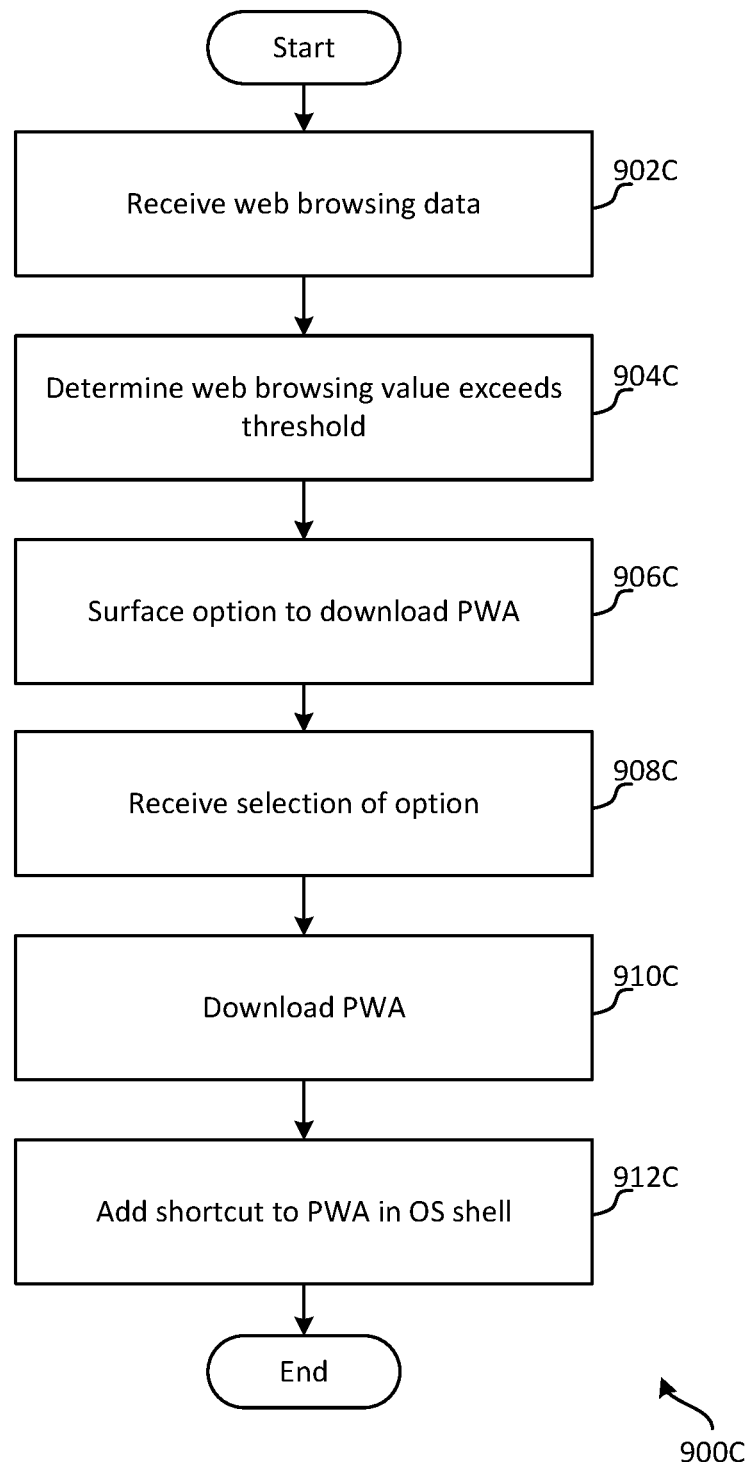
FIG. 9C illustrates an exemplary method for integrating progressive web application shortcuts in operating system shell constructs.

FIG. 9C illustrates an exemplary method 900C for integrating progressive web application shortcuts in operating system shell constructs. The method 900C begins at a start operation and flow moves to operation 902C where web browsing data for a user is received. In some examples, the site and service recommendation platform may additionally or alternatively receive device activity data and/or application data for a device associated with the user (e.g., via a user account used to login to a device). The data may be received by a site and service recommendation platform. The site and service recommendation platform may operate on one or more local devices (i.e., the user's devices), one or more remote devices (i.e., cloud-based), and/or partially on one or more local devices and partially on one or more remote devices. According to examples, the web browsing data may comprise: identities of websites browsed to by the user; identities of web applications utilized by the user; identities of web application features utilized by the user; duration of time spent on a website; duration of time spent on a particular portion of a website; duration of time spent using a feature of a website; a number of times a website has been accessed; and/or a number of times that a feature of a website has been accessed.

From operation 902C flow continues to operation 904C where a determination is made that a web browsing value for the user for the website exceeds a minimum threshold value. The web browsing value may relate to a number of times the user accessed a website or website feature, and/or a level of user engagement associated with a website. The threshold value may be a minimum number (e.g., number of times accessed), ratio (e.g., number of times website is accessed over a number of days, number of times website is accessed compared with number of browser instances opened), and/or a percentage (e.g., percentage of user engagement associated with a website compared with other websites), for example.

From operation 904C flow continues to operation 906C where a selectable option to download a progressive web application for the website is surfaced by a local computing device associated with the user.

From operation 906C flow continues to operation 908C where a selection of the option is received. The selection may comprise a mouse click, a touch screen input, and/or a verbal command, for example.

From operation 910C flow continues to operation 912C where the progressive web application is downloaded by the local computing device associated with the user.

From operation 912C flow continues to operation 914C where a shortcut to the progressive web application is added in an operating system shell construct of the local computing device. For example, a shortcut to the progressive web application may be added to a toolbar, a desktop, and/or a start menu, for example. The shortcut may be selectable for opening the progressive web application in a new browser window. The shortcut may also be interactable for initiating the display of a jump list having enhanced website actions accessible therefrom (e.g., view shipping info for a shopping website, post updates on a social media website, etc.).

From operation 914C flow continues to an end operation and the method 900C ends.

Figure 10:
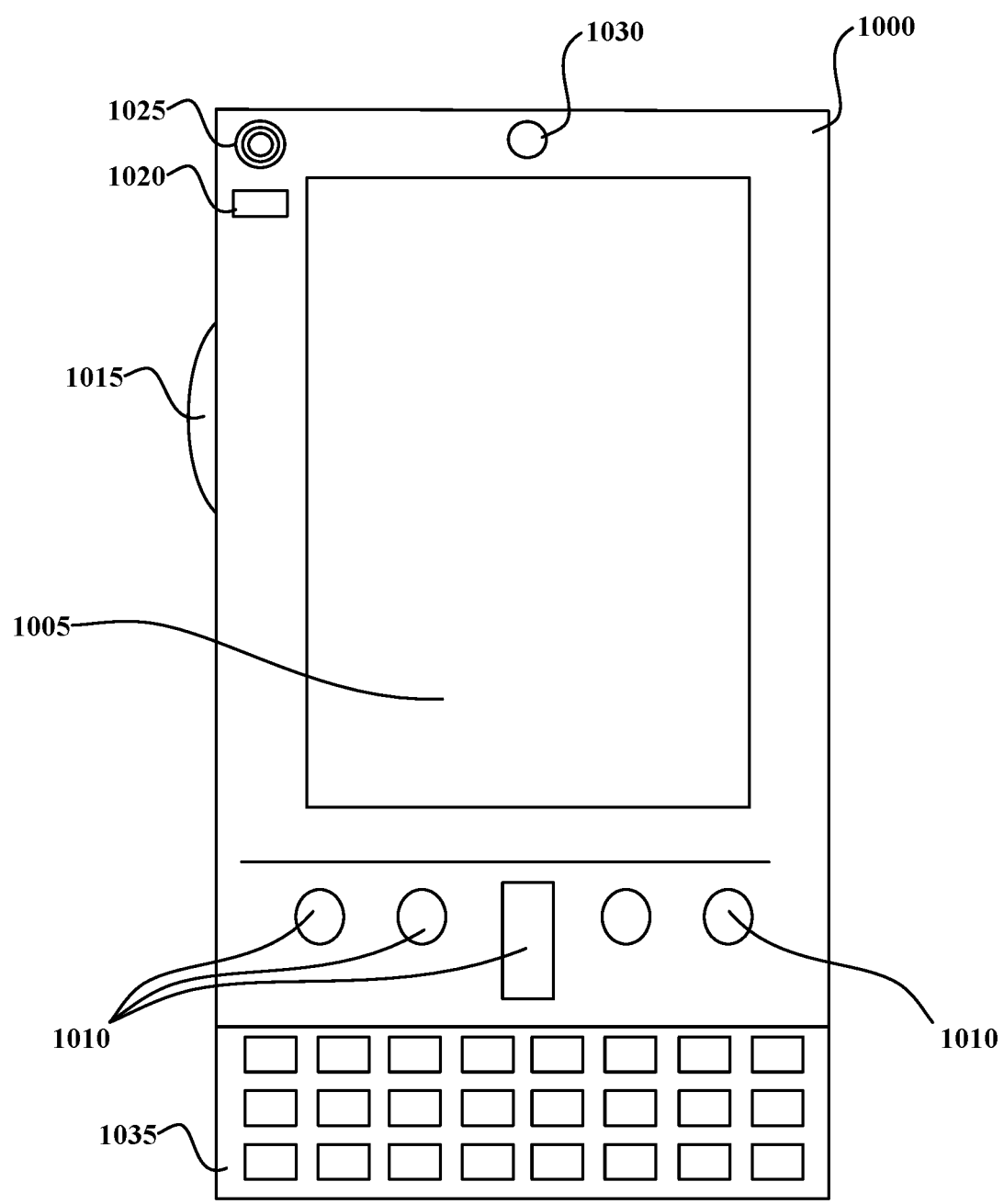
FIGS. 10 and 11 are simplified diagrams of a mobile computing device with which aspects of the disclosure may be practiced.
Figure 11:
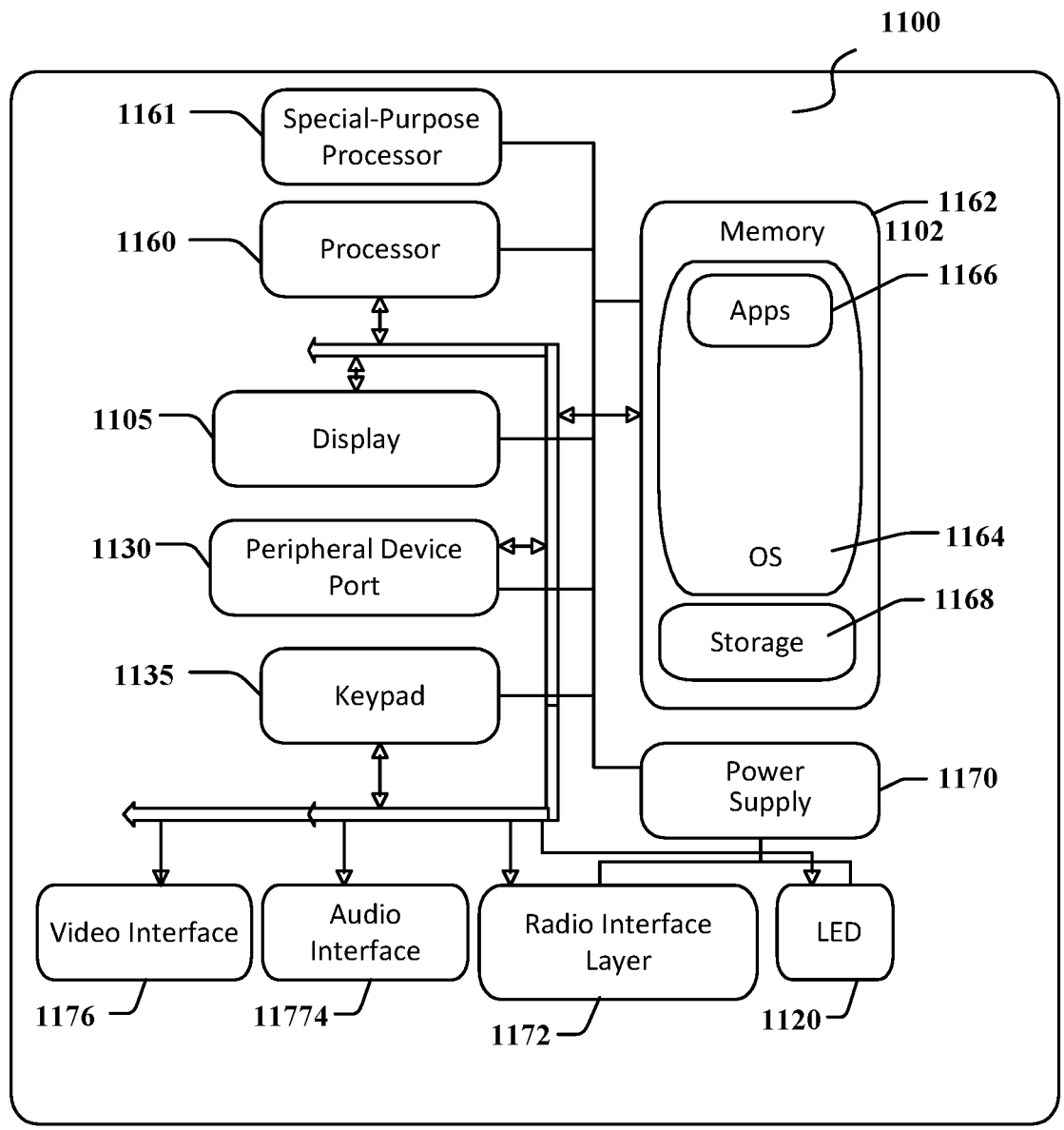

FIGS. 10 and 11 illustrate a mobile computing device 1000, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or fewer input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including instructions for providing and operating a digital assistant computing platform.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 702 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
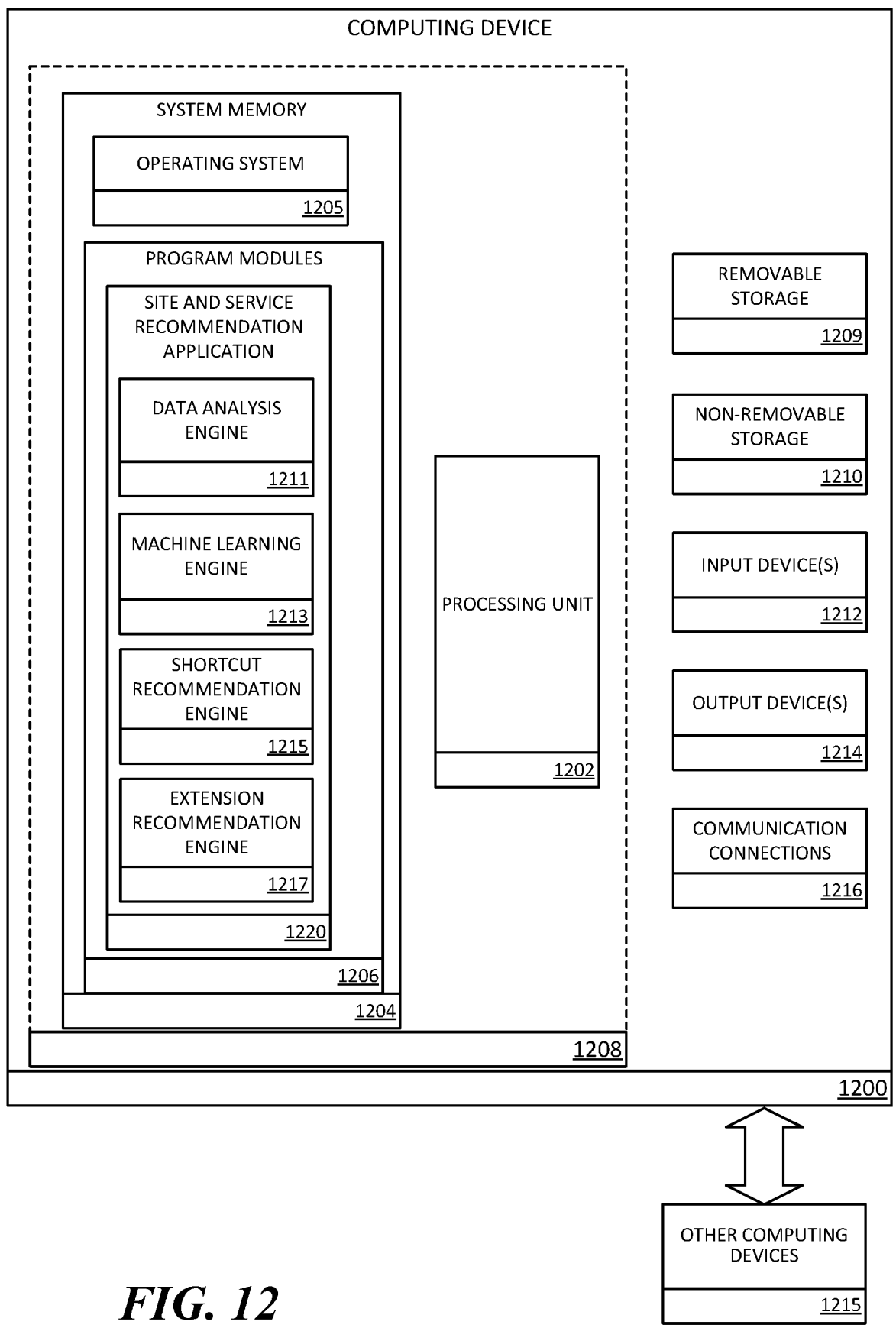
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for generating, surfacing and providing operations associated with site and service recommendations. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more digital assistant programs. The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., site and service recommendation engine 1220) may perform processes including, but not limited to, the aspects, as described herein. According to examples, data analysis engine 1211 may perform one or more operations associated with collecting and/or receiving web browsing, service, and/or application use data for users. Machine learning engine 1213 may perform one or more operations associated with applying one or more machine learning models (neural networks, statistical models) to web browsing, service, and/or application data to identify relevant site and service recommendations to service. Shortcut recommendation engine 1215 may perform one or more operations associated with surfacing recommendations to pin and/or add shortcuts to webpages in shell constructs (e.g., taskbar, start menu, desktop). Extension recommendation engine 1217 may perform one or more operations associated with surfacing recommendations to add extensions to website actions and/or service actions.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
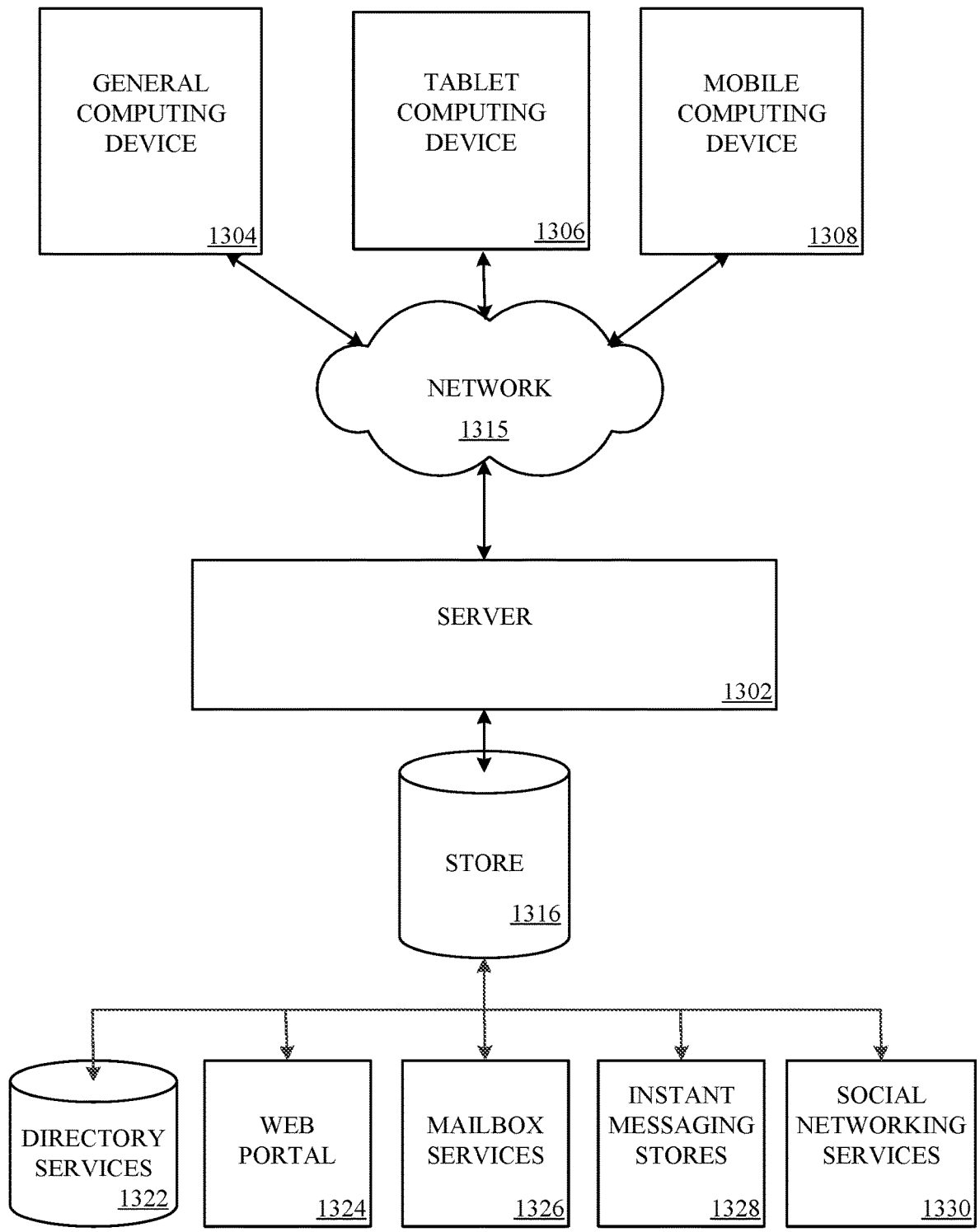
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various data and documents may be stored using a directory service 1322, a web portal 1324, a mailbox service 1326, an instant messaging store 1328, or a social networking site 1330. The program modules 1206 may be employed by a client that communicates with server device 1302, and/or the program modules 1206 may be employed by server device 1302. The server device 1302 may provide data to and from a client computing device such as a personal/general computer 1304 (including virtual PCs/terminal PCs/thin workstations), a tablet computing device 1306 and/or a mobile computing device 1308 (e.g., a smart phone, smart watch) through a network 1315. By way of example, the computer systems described herein may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for integrating web services in shell constructs, the method comprising:
   receiving:
      web browsing data comprising identities of websites browsed to by a user, identities of web applications utilized by the user, and identities of web application features utilized by the user, and
      application activity feed data for the user comprising identities of local applications utilized by the user, and identities of local application features utilized by the user;
   applying a neural network or statistical machine learning model to the web browsing data and application activity feed data, wherein the neural network or statistical machine learning model has been trained to generate a feature preference score indicative of a likelihood that the user will utilize an extension for a feature associated with a web service the user has utilized;
   calculating, based on application of the neural network or statistical machine learning model to the web browsing data and application activity feed data, the feature preference score for the feature; and
   providing, if the calculated feature preference score for the feature is above a threshold value, a selectable option to add an extension for the feature.

2. The computer-implemented method of claim 1, wherein the extension for the feature is a file directory browsing extension for browsing remote files from the operating system shell constructs of a local computing device of the user.

3. The computer-implemented method of claim 1, wherein the web browsing data provides an indication that the user utilizes a web storage service for a computing device that operates on a different platform than a computing device on which the selectable option to add the extension for the feature is provided.

4. The computer-implemented method of claim 1, further comprising:
   receiving device activity data for a device associated with a user account of the user; and
   applying the neural network or statistical machine learning model to the device activity data, the web browsing data, and the application activity feed data, and wherein the feature preference score for the feature associated with the web service the user has utilized is calculated based on application of the neural network or statistical machine learning model to the device activity data, the web browsing data, and the application activity feed data.

5. The computer-implemented method of claim 1, further comprising:
   determining that there is insufficient data for the user to accurately calculate the feature preference score for the feature;
   identifying a geographical region that the user resides in;
   identifying at least one feature that has an average feature preference score above a threshold value for users in the geographical region; and
   providing a selectable option to add an extension for the at least one feature.

6. The computer-implemented method of claim 1, wherein the web browsing data further comprises durations of time spent on websites browsed to by the user, and identities of websites that have been bookmarked by the user.

7. The computer-implemented method of claim 1, wherein the application feed data further comprises identities of shell actions utilized by the user.

8. A system for integrating web services in shell constructs, comprising:
   a memory for storing executable program code; and
   one or more processors, functionally coupled to the memory, the one or more processors being responsive to computer-executable instructions contained in the program code and operative to:
      receive web browsing data for a user, wherein the web browsing data comprises identities of websites browsed to by the user, identities of web applications utilized by the user, and identities of web application features utilized by the user;
      apply a neural network or statistical machine learning model to the web browsing data for the user, wherein the neural network or statistical machine learning model has been trained to identify preferred websites of users;
      determine, based on application of the neural network or statistical machine learning model, that a web browsing value for the user for a website exceeds a minimum threshold value;
      surface a selectable option to add a shortcut to the website on an operating system shell construct of a local computing device associated with the user;
      receive a selection of the option; and
      add the shortcut to the website on the operating system shell construct of the local computing device.

9. The system of claim 8, wherein the operating system shell construct of the local computing device is a taskbar of the operating system shell, and wherein in adding the shortcut to the website on the operating system shell construct of the local computing device, the one or more processors are further responsive to the computer-executable instructions contained in the program code and operative to:
   pin a shortcut to the web site on the taskbar of the operating system shell.

10. The system of claim 8, wherein the operating system shell construct of the local computing device is a start menu of the operating system shell, and wherein in adding the shortcut to the website on the operating system shell construct of the local computing device, the one or more processors are further responsive to the computer-executable instructions contained in the program code and operative to:
   add a shortcut to the website in the start menu of the operating system shell.

11. The system of claim 8, wherein the operating system shell construct of the local computing device is a desktop of the operating system shell, and wherein in adding the shortcut to the website on the operating system shell contract of the local computing device, the one or more processors are further responsive to the computer-executable instructions contained in the program code and operative to:
  add a shortcut to the website on the desktop of the operating system shell.

12. The system of claim 8, wherein in adding the shortcut to the website on the operating system shell construct of the local computing device, the one or more processors are further responsive to the computer-executable instructions contained in the program code and operative to:
  integrate the surfacing of notifications for the website into the operating system shell construct of the local computing device.

13. The system of claim 8, wherein the one or more processors are further responsive to the computer-executable instructions contained in the program code and operative to:
  receive a selection of the shortcut from the operating system shell construct;
  surface a jump list comprising a plurality of selectable actions performable by the website;
  receive a selection of one of the selectable actions; and
  perform, without navigating to the website in a web browser, an action corresponding to the selectable action.

14. The system of claim 13, wherein in performing the action corresponding to the selectable action the one or more processors are further responsive to the computer-executable instructions contained in the program code and operative to:
  communicate an API request from the operating system shell of the local computing device to a website service associated with the website.

15. The system of claim 8, wherein the one or more processors are further responsive to the computer-executable instructions contained in the program code and operative to:
  receive a selection of the shortcut; and
  open a progressive web application for the website in a standalone window.

16. The system of claim 8, wherein the web browsing data further comprises durations of time spent on websites browsed to by the user, and identities of websites that have been bookmarked by the user.

17. A computer-readable storage device comprising executable instructions that, when executed by one or more processors, assists with integrating web services in shell constructs, the computer-readable storage device including instructions executable by the one or more processors for:
  receiving web browsing data for a user, wherein the web browsing data comprises identities of websites browsed to by the user, identities of web applications utilized by the user, and identities of web application features utilized by the user;
  applying a neural network or statistical machine learning model to the web browsing data for the user, wherein the neural network or statistical machine learning model has been trained to identify preferred websites of users;
  determining, based on application of the neural network or statistical machine learning model, that a web browsing value for the user for a website exceeds a minimum threshold value;
  surfacing, by a local computing device associated with the user, a selectable option to install a progressive web application for the website;
  receiving a selection of the option;
  installing, by the local computing device associated with the user, the progressive web application; and
  adding a shortcut to the progressive web application in an operating system shell construct of the local computing device.

18. The computer-readable storage device of claim 17, wherein the operating system shell construct of the local computing device is one of: a taskbar, a start menu, and a desktop.

19. The computer-readable storage device of claim 17, wherein the instructions are further executable by the one or more processors for:
  receiving a selection of the shortcut from the operating system shell construct;
  surfacing a jump list comprising a plurality of selectable actions performable by the website via the progressive web application;
  receiving a selection of the selectable action; and
  performing, via an API communication between the progressive web application and a website service associated with the website, the selected action.

20. The computer-readable storage device of claim 17, wherein the web browsing data further comprises durations of time spent on websites browsed to by the user, and identities of websites that have been bookmarked by the user.

* * * * *